(12) United States Patent
Balachandran et al.

(10) Patent No.: US 6,324,268 B1
(45) Date of Patent: Nov. 27, 2001

(54) SPLITTER-LESS DIGITAL SUBSCRIBER LOOP MODEMS WITH IMPROVED THROUGHPUT AND VOICE AND DATA SEPARATION

(75) Inventors: Kumar Balachandran; Nils Rydbeck, both of Cary; R. David Koilpillai, Apex, all of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/259,964

(22) Filed: Mar. 1, 1999

(51) Int. Cl.$^7$ .................................................. H04M 11/00
(52) U.S. Cl. .................................. 379/93.08; 379/93.08; 379/93.09; 379/93.28; 379/93.31
(58) Field of Search ............................. 379/93.08, 93.09, 379/93.28, 93.31, 93.33; 375/222

(56) References Cited

U.S. PATENT DOCUMENTS

| | | | |
|---|---|---|---|
| 4,757,495 | 7/1988 | Decker et al. | 370/76 |
| 5,475,691 | 12/1995 | Chapman et al. | 370/110.4 |
| 6,061,392 | * 5/2000 | Bremer et al. | 375/222 |
| 6,101,216 | * 5/2000 | Henderson et al. | 375/222 |
| 6,151,335 | * 11/2000 | Ko et al. | 370/487 |
| 6,192,109 | 2/2001 | Amrany et al. | 379/30 |

FOREIGN PATENT DOCUMENTS

| | | | |
|---|---|---|---|
| WO 97/20396 | 6/1997 | (WO). | |
| WO98/27665 | 6/1998 | (WO) | H04B/1/38 |
| WO 99/34588 | 7/1999 | (WO) | H04M/11/00 |
| WO99/34588 | 7/1999 | (WO) | H04M/11/00 |
| WO 99/59322 | 11/1999 | (WO) | H04M/11/06 |

OTHER PUBLICATIONS

Johansson, Albin, ADSL Lite–The broadband enable for the mass market, *Ericsson Review*, No. 4, pp. 154–161 (1998).
Johansson, Albin, ADSL Lite—the broadband enabler for the mass market; *Ericsson Review No. 4*, pp. 154–161 (1998).
International Search Report, International Application No. PCT/US99/29082.

* cited by examiner

*Primary Examiner*—Stella Woo
(74) *Attorney, Agent, or Firm*—Myers Bigel Sibley & Sajovec

(57) ABSTRACT

A digital subscriber loop (DSL) modem and methods for controlling a DSL modem are provided which support simultaneous voice and data communications, wherein the voice communication is provided in a first frequency range and the data communication is provided in a second, non-overlapping frequency range. A voice communication is detected in the first frequency range and the output power associated with the data communication in the second frequency range is reduced when a voice communication in the first frequency range is detected. Furthermore, the coding level associated with the data communication in the second frequency range may be increased when a voice communication in the first frequency range is detected. Also, the start frequency associated with data communication in the second frequency range may be increased when a voice communication in the first frequency range is detected.

30 Claims, 8 Drawing Sheets

SPLITTER-LESS DIGITAL SUBSCRIBER LOOP MODEMS WITH IMPROVED THROUGHPUT AND VOICE AND DATA SEPARATION

FIELD OF THE INVENTION

The present invention relates to digital subscriber loop modems and more particularly to such modems which do not employ a splitter to separate voice and data frequencies.

BACKGROUND OF THE INVENTION

Recently, with an increase in the use of the Internet, the potential for digital subscriber loops (DSL) such as Asymmetric Digital Subscriber Loop (ADSL), High Speed DSL (HDSL) and Very High Speed DSL (VDSL) to provide benefits for communications has become apparent. Such a subscriber loop allows for increased transfer rates of downloaded data and uploaded data for a remote user. For example, a loop with 24 AWG twisted pair cable of about 18000 feet may be capable of transfer rates of 6 Mb/s downstream and 1 Mb/s upstream.

The data rates of an ADSL system are generally superior to those of a conventional telephone subscriber loop. Such a conventional subscriber loop, for example, may be capable of transporting 33.6 kb/s in the "voice band." The voice band is typically characterized as the frequency range 300–4000 Hz. The conventional subscriber loop may be limited by the use of hybrids at local exchanges and by line interface cards that allow the multiplexing of multiple voice bands on T1 carriers on the inter-exchange and inter-office networks of the telephone carriers. Line bandwidth may also be limited by the use of loading coils (typically found on loops of greater than 18000 feet in length) that serve to balance the loop periodically.

In order to achieve the high data rates of HDSL, ADSL and VHDSL, these digital subscriber loops typically bypass the inductive elements and load balancing components of the conventional telephone network. Such a bypass arrangement is illustrated in FIG. 1 which describes a conventional digitally switched telephone network. As seen in FIG. 1, a user at a remote premise 10 utilizes a telephone device 12 to communicate with a local exchange digital loop interface 14. The signal is provided to a hybrid circuit 16 which provides the signal to an analog to digital converter 18 which converts the analog signal to a digital signal. The digital signal is to multiplexer circuit 20 which packetizes and multiplexes downstream or de-multiplexed upstream. The upstream signal is then provided to the central switching office. In the downstream direction, the signal is received from the central switching office and operations proceed back through the multiplexer circuit 20, analog to digital interface 18 and the hybrid circuit 16.

As described above, ADSL allows for the asymmetric data rates in the downstream (network to subscriber) and upstream (subscriber to network) directions. ADSL also allows for concurrent transmission of conventional analogue telephone signals on the same circuit. ADSL uses the frequencies above the voice band (i.e. above 4000 Hz) to transfer high speed data between the network and the subscriber. ADSL may utilize a discrete multi-tone scheme, as described by the specification ANSI T1.413, for the transfer of data. The discrete multi-tone system of ANSI T1.413 also specifies two forms of encoding. A mandatory Reed Solomon code and an optional TCM code. These forms of encoding provide robustness in a noisy interference limited environment. In addition, data is interleaved over a long period of time, thereby protecting the transmission from localized disturbances such as impulse noise.

In a discrete multi-tone system, data is encoded into sub-carriers within the range of frequencies allocated for use in the discrete multi-tone system. The amount of data modulating a particular sub-carrier is determined during a training process where the impact of the characteristics of the ADSL connection are evaluated to determine the amount of data that each frequency may effectively support. This determination typically results in frequencies with a high signal to noise ratio being associated with higher rates of encoded data and frequencies with a low signal to noise ratio being associated with lower rates. Thus, ADSL typically utilizes the training process to determine the channel response and then the channel rates and coding that will maximize throughput for that channel response. Standards that describe conventional ADSL modems include ANSI T1.413 which describes Discrete Multi-tone Modulation (DMT).

Because ADSL typically allows for concurrent voice and data communications, ADSL modems typically include a splitter which separates processing of the voice band signal from the processing of the digital data signal. This separation typically must be capable of handling transients that occur on the phone line when calls are initiated and terminated to avoid such transients impacting the digital data signal. However, this ability to handle transients may adversely affect the throughput of the data signal. The splitter effectively isolates the ADSL signal and the voice-band signal from each other.

The splitter may also serve to protect the voice band signals from the data signals of the higher ADSL frequencies, which are typically higher power signals. Furthermore, the cost of installation of the splitter at a customer's premises may limit the widespread acceptance of ADSL. One example of a splitter assembly is illustrated in PCT Application No. WO 97/20396 to Russell et al. entitled POTS SPLITTER ASSEMBLY WITH IMPROVED TRANSHYBRID LOSS FOR DIGITAL SUBSCRIBER LOOP TRANSMISSION.

A conventional ADSL modem with a splitter is illustrated in FIG. 2. As seen in FIG. 2, the Internet 30 may provide a signal to a network bridge 32 which provided a signal to a xDSL modem 34. As used herein "xDSL" is a generic term denoting the entire class of DSL signals. Thus, the terms "DSL" and "xDSL" are use interchangeably. The xDSL modem then provides a signal to the splitter/combiner 36 which also receives a signal from a line termination of a POTS/ISDN line 44. The first splitter/combiner 36 then sends the combined signal to a second splitter/combiner 38 (typically at a remote location). The second splitter/combiner 38 receives the combined signal and may separate the POTS/ISDN signals from the DSL signals and provide the DSL signals to a xDSL modem 40. The xDSL modem 40 may then convert the DSL signals to data and provide the data to a bridge 42 connected to a second network, such as an Ethernet network. The POTS/ISDN signal from splitter 38 may be separately processed as a voice signal. Similarly, signals generated by the second xDSL modem 40 or POTS/ISDN line could be combined in the second splitter/combiner 38 and then separated in the first splitter/combiner 36 for communication in the reverse direction.

One solution which has been proposed to address the need for a splitter in an ADSL system is an ADSL modem which reduces the transmission power by 6–9 db in the ADSL frequencies to reduce spill over from the ADSL band to the voice band. Furthermore, the start tone of the upstream ADSL frequencies may be increased in frequency to thereby leave a larger buffer of inactive frequencies between the ADSL band and the voice band. A further proposed solution is to increase the coding on the ADSL data to increase the error correction of the data to compensate for errors caused by reducing the transmission power or by transients from the initiation or termination of calls. However, the consequence of these attempts to eliminate the splitter is that the data throughput of the ADSL modem will typically be decreased for all communication, including when the telephone instrument is not in use. For example, as a result of lower transmit power, the effective data rate for downstream communications may be reduced from 6 Mb/s to from 500 to 1000 kb/s.

A system using a modem which does not require splitters is illustrated in FIG. 3. As seen in FIG. 3, the DSL modems of FIG. 2 have been replaced with low power DSL modems 48 and 50 described above and the splitter/combiner 38 at the customer premises has been eliminated. Alternatively, the splitter/combiner may be eliminated at both the central office and the customer premises. In the system illustrated in FIG. 3, the ADSL and voice signals may both be provided to the line termination 44 or the telephone 46 as well as to the DSL modems 48 and 50. While the system of FIG. 3 may not use a splitter/combiner at both locations, as discussed above, data throughput will typically be reduced in comparison to the system of FIG. 2.

A system for the concurrent transmission of voice and data have is described in U.S. Pat. No. 4,757,495 to Decker et al. entitled SPEECH AND DATA MULTIPLEXOR OPTIMIZED FOR USE OVER IMPAIRED AND BANDWIDTH RESTRICTED ANALOG CHANNELS. Decker et al. describes a system which uses an ensemble modem which operates using carrier frequencies in the voice band and varies the amount of bandwidth in the voice band utilized for data based on the presence or absence of a voice call. When the modem changes the allocation of the voice band between voice and data communications the modem retrains to compute a new modulation scheme. The allocation between voice and data sub-bands may be based on user preferences of the desired speech quality.

U.S. Pat. No. 5,475,691 to Chapman et al. entitled VOICE ACTIVATED DTAT RATE CHANGE IN SIMULTANEOUS VOICE AND DATA TRANSMISSION describes a simultaneous voice and data modem which performs voice activated data rate changes. Thus, when the modem detects a local telephone call, the modem selects a signal space and a lower symbol density which provides for a higher quality voice transmission.

In light of the above discussion, a need exists for improvements in DSL modems which do not utilize a splitter so as to take better advantage of the benefits of separate frequencies for voice and data and so as to promote the widespread implementation of DSL by reducing the costs associated with such an implementation.

SUMMARY OF THE INVENTION

In view of the above discussion, it is an object of the present invention to provide a splitter-less DSL modem with improved data throughput.

A further object of the present invention is to provide high data throughput in a DSL modem without the expense of a splitter.

Still another object of the present invention is to provide for increased data throughput while maintaining voice communication quality.

These and other objects of the present invention are provided by methods and systems for controlling a digital subscriber loop (DSL) modem which provides simultaneous voice and data communications. The voice communication is provided in a first frequency range and the data communication is provided in a second frequency range. Control of the DSL modem is provided by detecting a voice communication in the first frequency range and reducing the output power associated with the data communication in the second frequency range when a voice communication in the first frequency range is detected. Furthermore, the coding level associated with the data communication in the second frequency range may be increased when a voice communication in the first frequency range is detected. Also, the start frequency associated with data communication in the second frequency range may be increased when a voice communication in the first frequency range is detected. Furthermore, the number of tones used could be dynamically decreased, allowing higher energy per transmitted bit for those tones that are in use.

By selectively compensating for voice communications when voice communications are detected, the overall throughput of the DSL modem may be increased as no compensation is required if a voice communication is not present. Thus, the modem may operate with a combination of one or more strategies including reduced coding, increase of interleaving, increased power and a lower start frequency until a voice communication is detected and then compensate for the voice communication. Accordingly, the present invention provides for increased throughput without requiring the use of a splitter. Furthermore, voice communication quality can be maintained clost to that obtained with a splitter, while overall or average data throughput is increased.

In still further embodiments of the present invention, the modem is retrained utilizing the reduced power when a voice communication is detected. In particular, a voice communication may be detected by detecting a ringing tone in the first frequency range. An off-hook condition of a voice communications device associated with the modem may also be detected. Such an off-hook condition may be detected by detecting the presence of a line voltage in a connection associated with the voice communications device. Alternatively, the presence of a dial tone may be detected to detect the off-hook condition.

In still another embodiment of the present invention, the termination of an active voice communication in the first frequency range is detected. This termination may be detected by detecting an absence of a signal in the first frequency range for a specified period of time, for example, 2 to 5 seconds, or detecting an absence of a line voltage in a connection associated with a voice communications device associated with the modem. If the absence of a voice communication is detected, then the output power associated with data communication in the second frequency range may be increased. Furthermore, the modem may be retrained utilizing the increased output power.

In a particular embodiment of the present invention, a splitter-less digital subscriber loop (DSL) modem is provided which provides simultaneous voice and data communication. The voice communication is provided in a first frequency range and the data communication is provided in a second frequency range is provided. The DSL modem includes a voice communication detector which detects the presence of a voice communication in the first frequency range. The modem further includes a data communication controller, responsive to the voice communication detector, which controls an output power of the data communication so as to reduce the output power of the data communication in the second frequency range when a voice communication is detected.

The data communication controller may further control training of the DSL modem for communication of data in the second frequency band. In such a case, the data communication controller retrains the DSL modem utilizing the reduced output power when a voice communication is detected. The data communication controller may also control the level of coding of data in the data communication. The data communication controller may then increase the level of coding when a voice communication is detected.

In a particular embodiment, the DSL modem is an Asymmetric Digital Subscriber Loop modem.

In still another embodiment of the present invention, the voice communication detector comprises an off-hook detector which detects an off-hook condition of a voice communication device associated with the modem. Such an off-hook detector may detect the presence of a line voltage on a connection associated with the voice communication device. The off-hook detector may also detect a dial tone on a connection associated with the voice communication device. Alternatively, a drop in current may be detected, indicating that the current drawn by a load on the DSL circuit has been divided between the DSL circuit and another shunt.

In another embodiment of the present invention, the voice communication detector includes a ring detector for detecting a ringing tone in the first frequency range.

In yet another embodiment of a DSL modem according to the present invention, the data communication controller controls the output power of the data communication so as to increase the output power of the data communication in the second frequency range when a voice communication is not detected. The data communication controller may also control training of the DSL modem for communication of data in the second frequency band so as to retrain the DSL modem utilizing the increased output power when a voice communication is not detected.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

Figure 1:
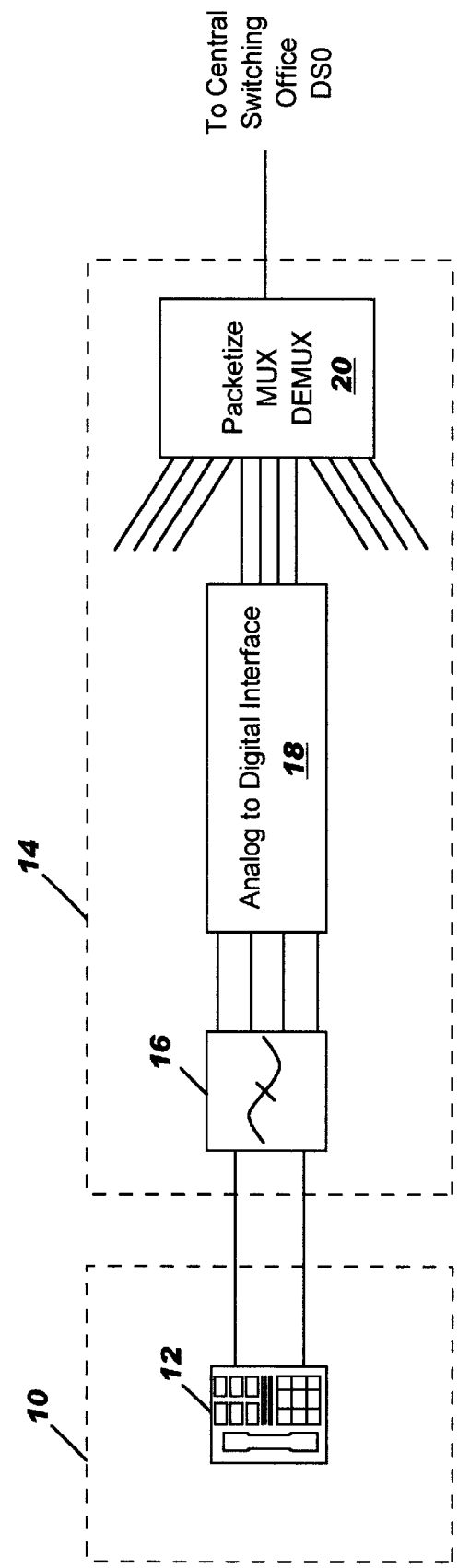
FIG. 1 is a block diagram of a conventional digitally switched telephone circuit without xDSL.
Figure 2:
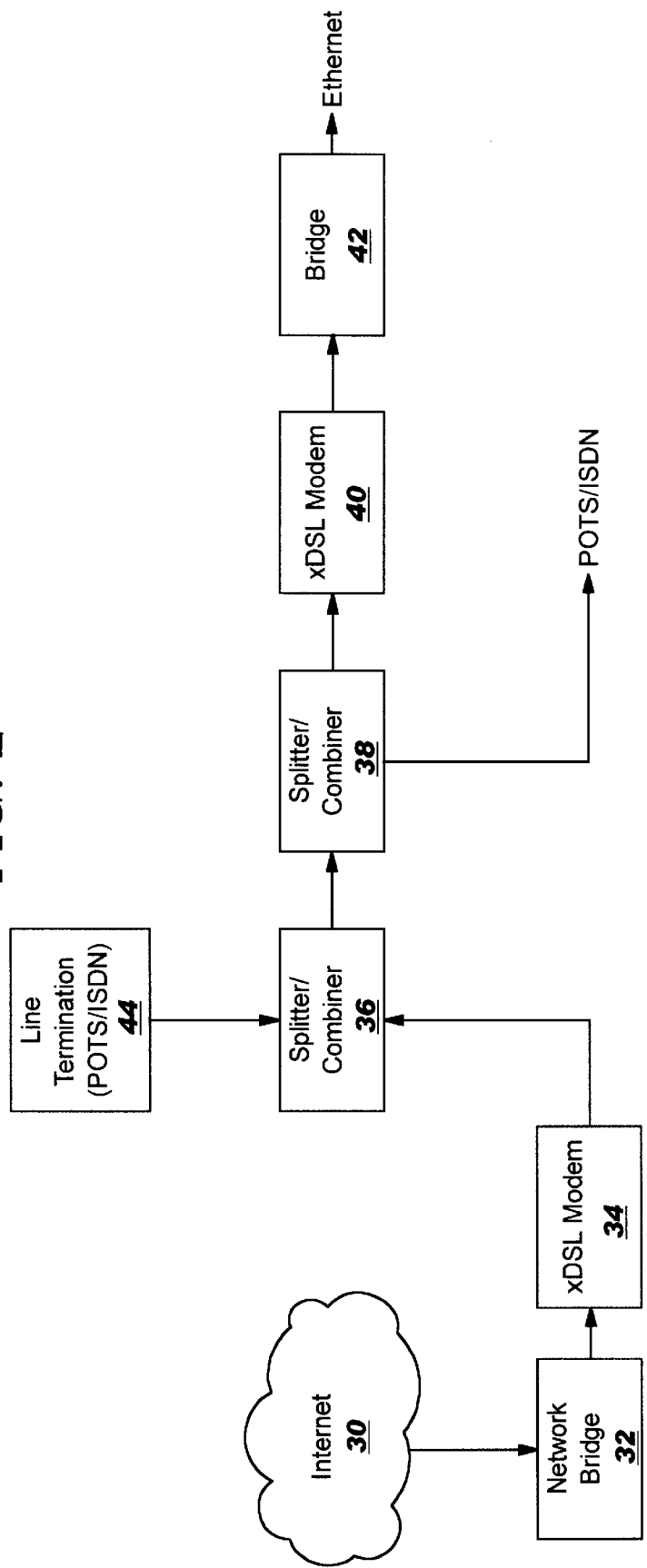
FIG. 2 is a block diagram of a system using a conventional ADSL modem with a splitter.
Figure 3:
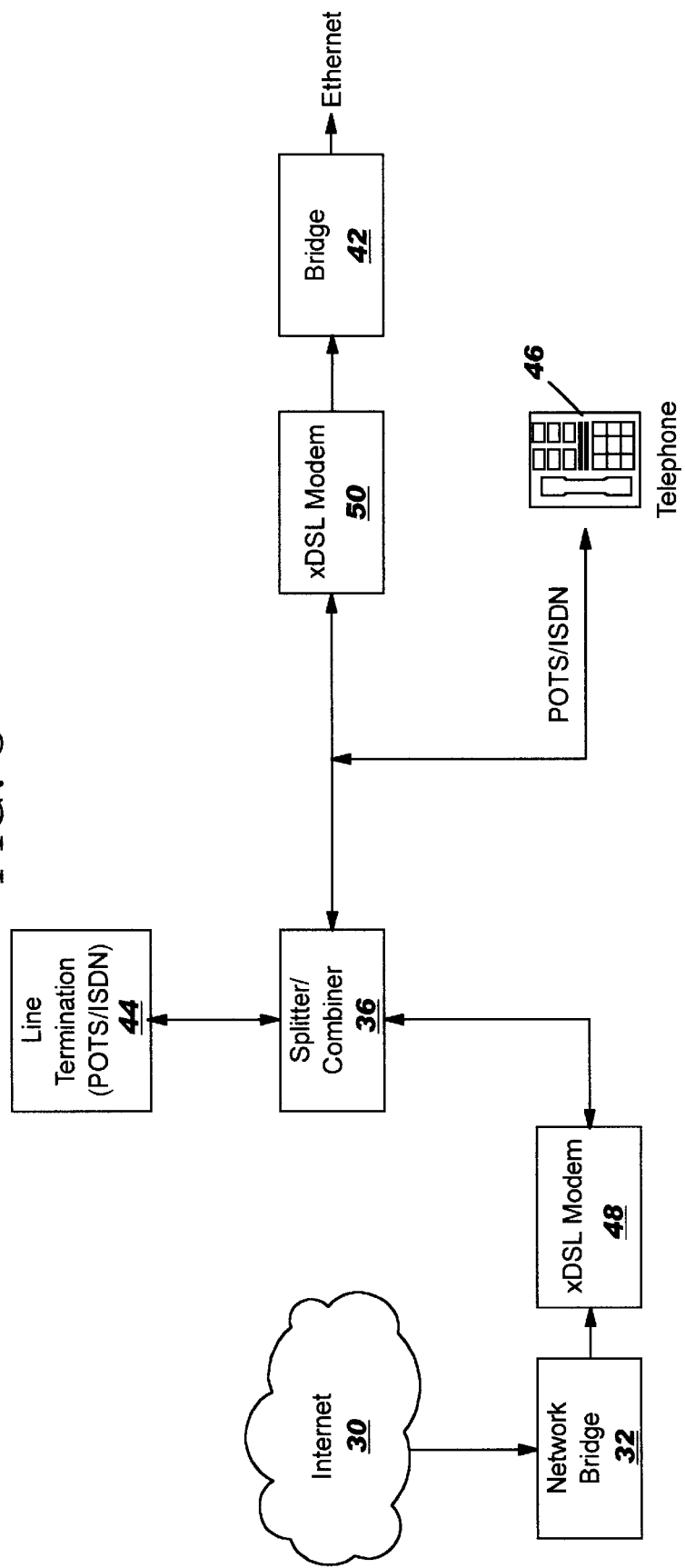
FIG. 3 is a block diagram of a system using a conventional ADSL modem which does not utilize a splitter.
Figure 4:
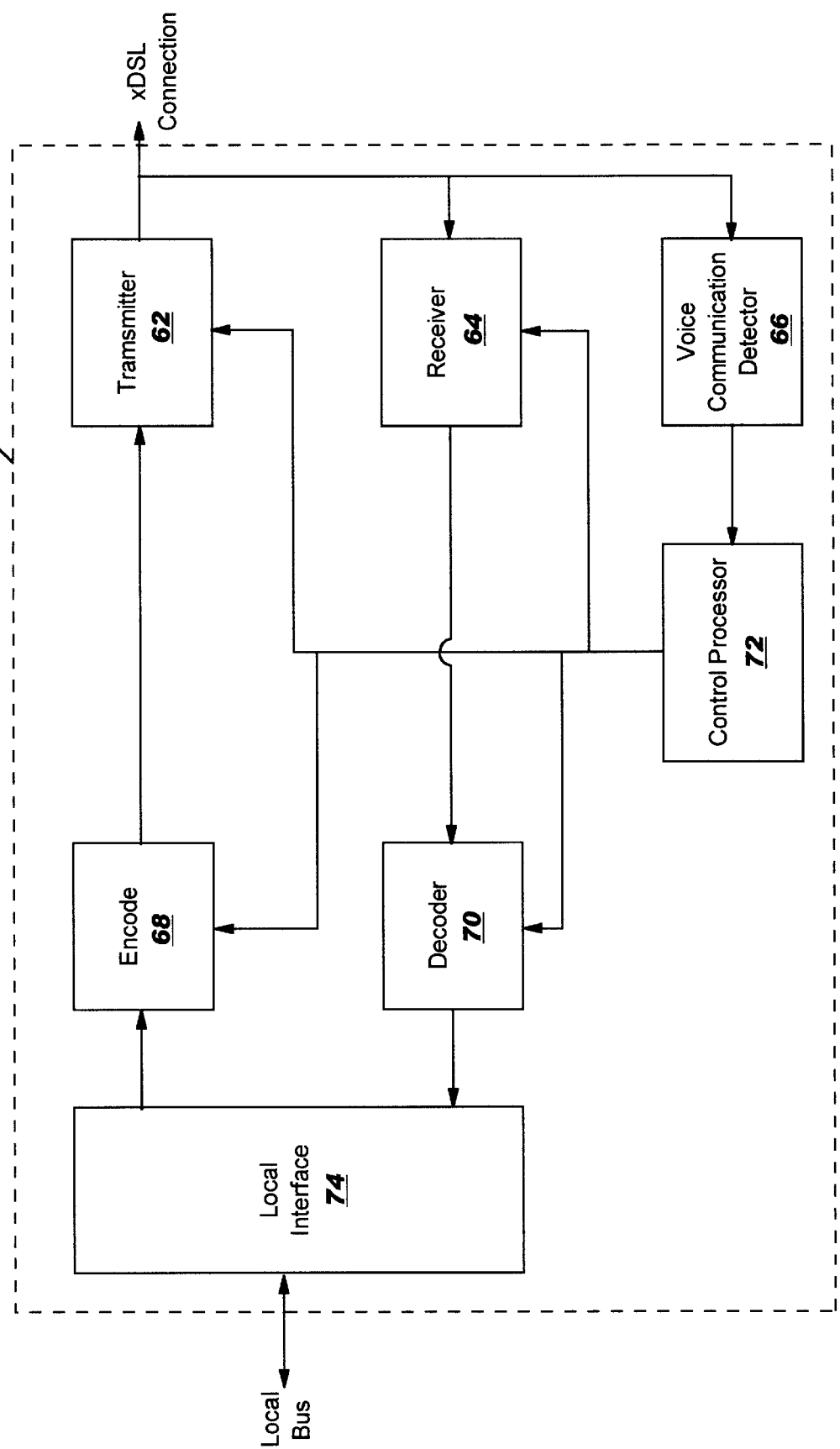
FIG. 4 is a block diagram of a DSL modem according to one embodiment of the present invention.

FIG. 4 illustrates a DSL modem 60 according to the present invention which may provide increased throughput while not requiring a splitter. Thus, the DSL modem of FIG. 4 may be used in the system of FIG. 3 by replacing the illustrated DSL modems 48 and 50 with DSL modems of the type illustrated in FIG. 4. The present invention will be described with respect to an ADSL modem which utilizes discrete multi-tone modulation. However, as will be appreciated by those of skill in the art, the teachings of the present invention may be applicable to any simultaneous voice and data modem which transmits voice information in a first frequency band and data information in a second frequency band. Preferably, the second frequency band includes frequencies which are not in the first frequency band (the voice band) and more preferably, the first and second frequency bands are non-overlapping.

As is seen in FIG. 4, the DSL modem 60 includes a transmitter 62 and receiver 64 which are connected to the DSL connection. The transmitter 62 preferably is a variable power transmitter such that the transmitter power may be reduced during concurrent voice and data communications. The transmitter 62 and receiver 64 also preferably include variable start frequencies for the discrete multi-tone modulation in the data frequency band such that the start frequency of the discrete multi-tone data may be increased in the presence of a voice communication so as to increase the separation between the voice communication in the first frequency band and the data communication in the data communication band. The transmitter 62 and receiver 64 may also dynamically decrease the number of tones used during voice communications to allow higher energy per transmitted bit for those tones that are in use.

As will be appreciated by those of skill in the art in light of the present disclosure, references to the start frequency of the discrete multi-tone transmission refer to the lowest frequency containing data in the transmission. Thus, increasing the start frequency may effectively reduce the amount of data that may be simultaneously transmitted by reducing the number of frequencies into which data may be encoded. However, as will also be appreciated by those of skill in the art, by increasing the start frequency of the discrete multi-tone transmission, the separation between the voice band and the data band may be increased, thus, reducing the interaction of transmissions in the voice band with transmissions in the data band.

While the transmitter 62 and receiver 64 have been illustrated as single blocks in FIG. 4, as will be appreciated by those of skill in the art, the transmitter 62 and receiver 64 may comprise multiple components such as analog to digital converters, digital to analog converters, discrete fourier transforms, inverse discrete transforms and other such components so as to provide for the modulation and demodulation of discrete multi-tone modulated signals. They may also be packaged together as a transceiver. Accordingly, the transmitter 62 and receiver 64 may take the form of discrete components, custom integrated circuits, or a combination of discrete components and integrated circuits. Furthermore, many of the functions of the blocks illustrated in FIG. 4 may be implemented in special purpose processors such as a digital signal processor or in general purpose processors.

Also illustrated in FIG. 4 is a voice communication detector 66 which detects the presence of a voice communication on the DSL connection. Such a detection may be made by monitoring the off-hook status of a telephone device associated with the DSL connection, detecting the presence of a ring signal in the voice frequency band or detecting the presence of a dial tone in the voice frequency band. As will be appreciated by those of skill in the art, other methods of determining the presence of a voice communication may also be utilized while still benefiting from the teachings of the present invention.

As is further illustrated in FIG. 4, the DSL modem 60 includes an encoder 68 and a decoder 70 for encoding information received from the local interface 74 and for decoding information from the receiver 64 to be provided to the local interface 74. The encoder 68 and decoder 70 preferably allow for variable coding rates such that the coding rate may be increased or decreased based on the presence of a concurrent voice communication. The local interface 74 provides access to the DSL modem 60 and may take any of a number of forms. For example, the DSL modem may be connected directly to a network, such as an Ethernet network, or may be incorporated in a computer or other processing system. Thus, the present invention should not be construed as limited to any particular local interface.

The DSL modem 60 of FIG. 4 also includes a control processor 72 which controls the training of the modem, the level of coding, the power output of the transmitter and the start frequency for the discrete multi-tone modulation of data in the data frequency band. Thus, the control processor 72 receives an indication of the presence or absence of a voice communication from the voice communication detector 66 and the selectively controls the transmitter 62, receiver 64, encoder 68 and decoder 70 as described below.

Figure 5:
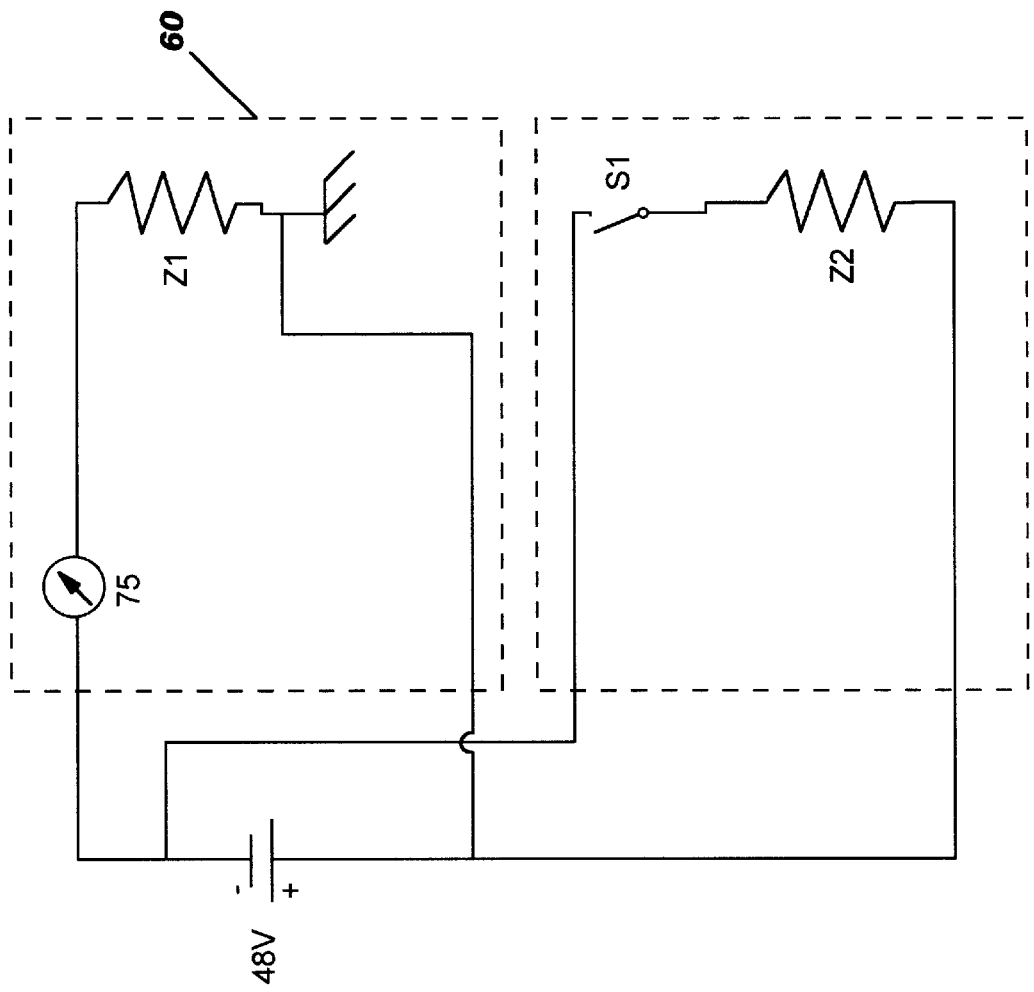
FIG. 5 is a block diagram of one embodiment of an off-hook detector suitable for use with one embodiment of the present invention.

As described above, the voice communication detector 66 detects the presence of a voice communication in the voice band. This detection may be carried out in any number of ways. For example, an off-hook condition of a telephone device may be detected by the DSL modem 60. A circuit for such detection is illustrated in FIG. 5. As seen in FIG. 5, the load presented by the DSL modem 60 to the transmission line is represented by Z1. The off-hook switch S1 of the telephone device and the load Z2 of the telephone device are also illustrated in FIG. 5. Furthermore, the voltage (48V attenuated by some line impedance) provided by the central office is also illustrated. When the telephone device goes off-hook, switch S1 closes and the sensor 75 detects the presence of the load of the telephone device resulting from the closure of switch S1. The sensor 75 may use a current detector that comprises an analog to digital circuit and a filter that detects change in current flowing through the load, due to the appearance of the new load constituted by the telephone. This may be observed for incoming as well as outgoing calls. When the load of the telephone device is detected as no longer present, then it is determined that the voice communication has ended.

Figure 6:
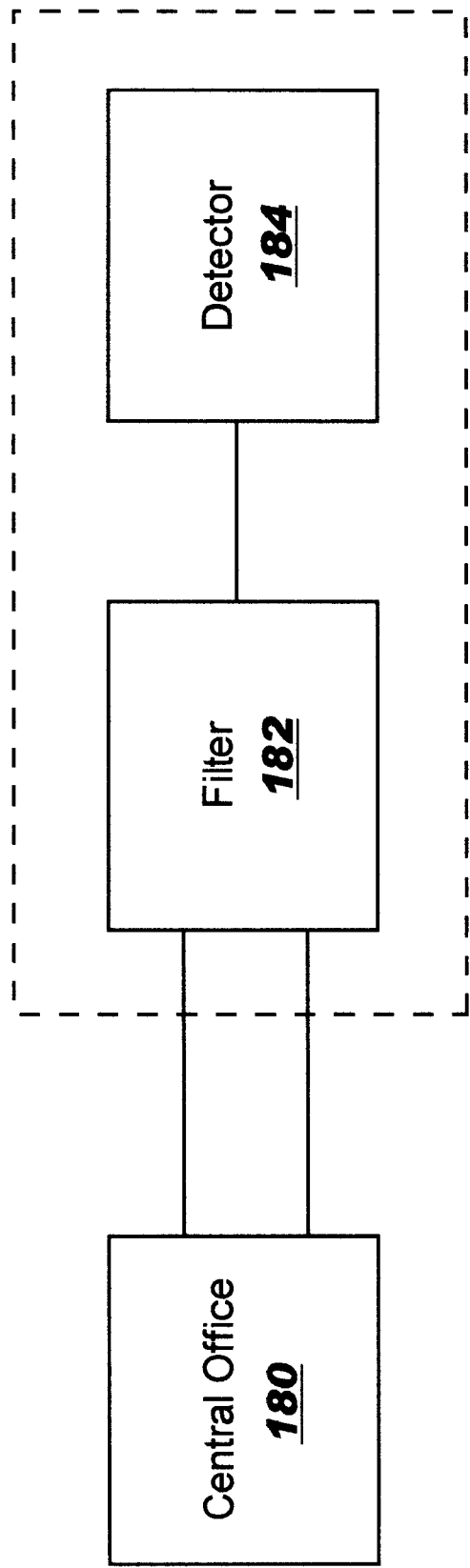
FIG. 6 is a block diagram of a ring tone detector suitable for use with one embodiment of the present invention.

Similarly, the voice communication detector 66 may use the presence of a ringing signal in the voice band to detect the initiation of a voice communication. Thus, the configuration of FIG. 6 may be utilized to detect the presence of a ring. As seen in FIG. 6, the signal from the central office 180 is filtered by filter 182 which may be a band pass filter to let pass frequencies in the range of the ring (e.g. 16–66 Hz). The detector 184 then detects the presence of energy in the pass band frequencies of band pass filter 182. If energy above a threshold value is present, then a ring is occurring and a voice communication is detected. Similarly, the presence of a dial tone could be detected in much the same manner, i.e. filtering in the frequency range of the dial tone and detecting the energy in the dial tone frequency range.

In still another embodiment of the voice communication detector 66, the voice band could be monitored for the presence of a signal. If a signal was present in the voice frequency range, then it would be determined that a voice communication was present. Such a detection could be carried out periodically, for example every 1 mS, during periods when data was not being communicated in the data frequencies. Thus, the effects of bleed-over from the second frequency band causing false detection of signals in the first frequency band could be avoided.

However the DSL modem 60 determines that a voice call is present, the control processor 72 preferably retrains the DSL modem utilizing a reduced transmitter power, a higher coding rate, a higher start frequency for the discrete multi-tone data and/or a decreased number of tones when a voice communication is detected. By reducing the output power, increasing the coding rate, using a higher start frequency and or decreasing the number of tones utilized, the bleed-over into the voice band may be reduced. Thus, the quality of voice communications may be maintained. By only utilizing the reduced power, higher coding rate, higher start frequency, and/or reduced number of tones when a voice communication is present in the voice band, the throughput of the DSL modem 60 may be increased to the maximum throughput when a voice communication is not present in the voice band. Thus, the overall throughput of the DSL modem 60 may be increased even though a splitter is not utilized by the modem.

As will be appreciated by those of skill in the art, the DSL modem 60 of FIG. 4 may be utilized on either the network or the subscriber side. However, in an ADSL implementation, the asymmetry of the modems would need to be taken into account and differing transmitter and receivers utilized at each end so as to take into account the asymmetry of data transmission.

The present invention will now be described with respect to FIGS. 7 through 8 which are flowchart illustrations of the operations of one embodiment of the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 7:
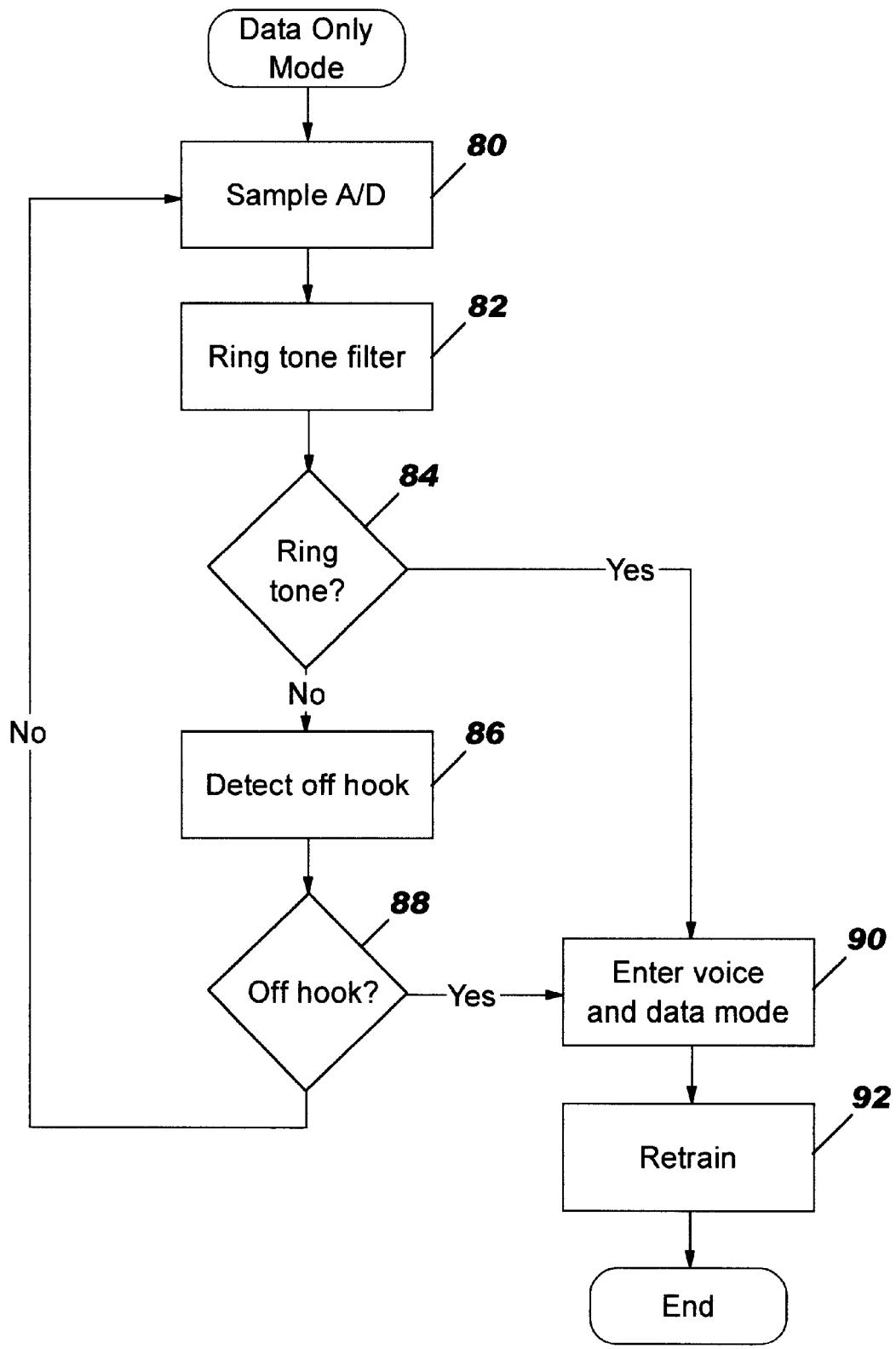
FIG. 7 is a flow chart illustrating operations during data only communications according to one embodiment of the present invention.

FIG. 7 illustrates operations of the present invention when the DSL modem 60 is operating in "data only" mode (i.e. when no voice communication has been detected and the modem is using high power, a lower start frequency and a reduced coding rate). When the modem 60 is in data only mode, the voice communication detector 66 monitors for a voice communication. Thus, as seen in block 80, the analog to digital conversion of the signal on the DSL connection is sampled (i.e. the output of an analog to digital converter of the receiver 64 or the output of the voice communication detector 66) and filtered for the ring tone (block 82).

If a ring tone is present (block 84), then the voice communication detector 66 notifies the control processor 72 of the presence of a voice communication and the modem 60 enters into voice and data mode (block 90). The modem 60 may optionally notify its counterpart modem that it is entering voice and data mode and that retraining of the modem will follow. Alternatively, if both of the communicating modems utilize the same criteria for the switch from data only mode to voice and data mode then each modem would automatically switch modes at about the same time.

The control processor 72 then sets the transmitter power to low power, increases the encoding of information to a higher coding rate and increases the start frequency of the discrete multi-tone data in the data frequency band (block 90) and retrains the modem 60 (block 92). Optionally, the number of tones utilized may also be decreased.

Pending data is preferably buffered while retraining is performed. The retraining is preferably delayed for a period of inactivity on the connector to allow the connection to quiesce. Furthermore, the retraining procedure may be augmented at either end by the addition of pseudo-random noise within the voice band.

As is further seen in FIG. 7, if the ring tone is not detected, it may be determined if an off-hook condition is detected (block 86). If an off-hook condition is detected (block 88) then the modem 60 would enter voice and data mode (block 90) as described above and the retraining procedure (block 92) would be carried out as described above. However, if an off-hook condition is not detected, then the process begins again with a new sample (block 80). This process would continue during data only transmission until a voice communication was detected or the data transmission was complete.

Figure 8:
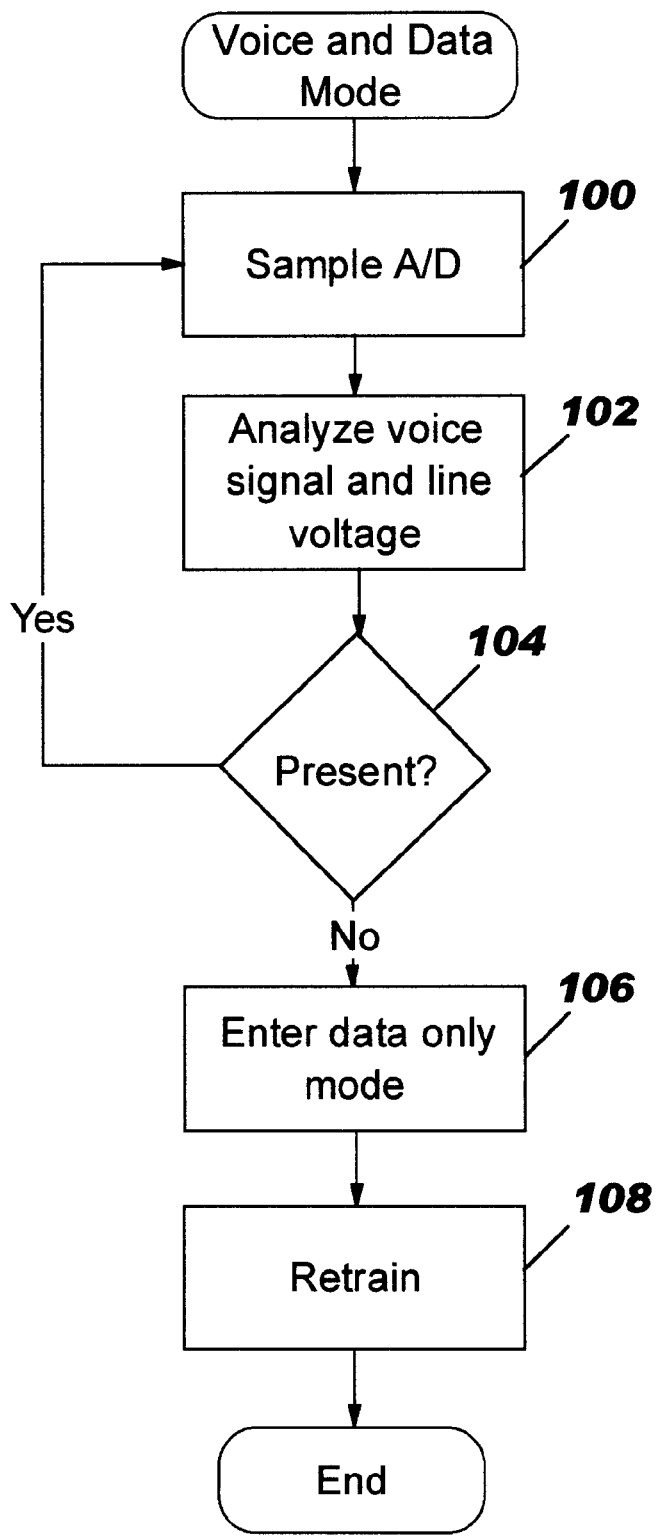
FIG. 8 is a flow chart illustrating operations during concurrent voice and data communications according to one embodiment of the present invention.

FIG. 8 illustrates the operations of the present invention when the modem 60 is in voice and data mode. As seen in FIG. 8, the analog to digital converter output of the received signal is sampled (block 100). The samples are then analyzed for the presence of a voice signal or the line voltage associated with an off-hook condition (block 102). If a voice signal and the line voltage are not present, then the voice communication detector 66 notifies the control processor 72 that the voice communication has terminated (block 104). If either a voice signal or the line voltage are present, then the next sample is obtained (block 100). This process continues until it is determined that the voice communication has completed or the data transmission has completed.

If a voice communication has terminated, then the modem 60 may enter data only mode (block 106). Thus, the control processor 72 would increase the transmitter power, reduce the coding rate and decrease the start frequency so as to increase the data rate of data transmitted in the data frequency band. If the reduced number of tones were utilized during voice communication, then the number of tones utilized may be increased. The modem 60 would then retrain (block 108) so as to maximize throughput. The switch from voice and data mode to data only mode may also be accompanied by notification to the counterpart modem as described above.

As used herein, voice communication refers to a communication in the voice band and could be speech or data communication, for example, by a conventional analog modem. Furthermore, references to coding rate will be understood by those of skill in the art to refer to the degree of error corrective coding encoded into bits to be transferred. Thus, for example, if 8 bits are encoded into 64 bits, the coding rate may be increased by encoding the same 8 bits into more than 64 bits, for example into 128 bits. Typically, increases in coding rate decrease raw data throughput but increases error correction.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A splitter-less digital subscriber loop (DSL) modem, which provides simultaneous voice and data communication, wherein the voice communication is provided in a first frequency range and the data communication is provided in a second, non-overlapping, frequency range, the modem comprising:

a voice communication detector which detects the presence of a voice communication in the first frequency range;

a data communication controller responsive to the voice communication detector and which controls at least one of a coding rate of data and a level of interleaving of data in the data communication and wherein the data communication controller increases the at least one of a coding rate and a level of interleaving when a voice communication is detected.

2. A DSL modem according to claim 1, wherein the data communication controller further controls a number of tones utilized in the data communication and wherein the data communication controller decreases the number of tones when a voice communication is detected.

3. A DSL modem according to claim 1, wherein the DSL modem comprises an Asymmetric Digital Subscriber Loop modem.

4. A DSL modem according to claim 1, wherein the voice communication detector comprises an off-hook detector which detects an off-hook condition of a voice communication device associated with the modem.

5. A DSL modem according to claim 4, wherein the off-hook detector detects the presence of at least one of a line current and a line voltage on a connection associated with the voice communication device.

6. A DSL modem according to claim 4, wherein the off-hook detector detects a dial tone on a connection associated with the voice communication device.

7. A DSL modem according to claim 4, wherein the voice communication detector further comprises a ring detector for detecting a ringing tone in the first frequency range.

8. A DSL modem according to claim 1, wherein the voice communication detector comprises a ring detector for detecting a ringing tone in the first frequency range.

9. A DSL modem according to claim 1, wherein the data communication controller further controls the output power of the data communication so as to increase the output power of the data communication in the second frequency range when a voice communication is not detected.

10. A DSL modem according to claim 9, wherein the data communication controller further controls training of the DSL modem for communication of data in the second frequency band and wherein the data communication controller retrains the DSL modem utilizing the increased output power when a voice communication is not detected.

11. A method of controlling a digital subscriber loop (DSL) modem which provides simultaneous voice and data communications, wherein the voice communication is provided in a first frequency range and the data communication is provided in a second, non-overlapping, frequency range, the method comprising the steps of:

detecting a voice communication in the first frequency range; and increasing at least one of a coding rate and an interleaving level associated with the data communication in the second frequency range when a voice communication in the first frequency range is detected.

12. A method according to claim 11, further comprising the step of increasing a start frequency associated with data communication in the second frequency range when a voice communication in the first frequency range is detected.

13. A method according to claim 11, further comprising the step of decreasing a number of tones utilized in data communication in the second frequency range when a voice communication in the first frequency range is detected.

14. A method according to claim 11, wherein the detecting step comprises the step of detecting a ringing tone in the first frequency range.

15. A method according to claim 11, wherein the detecting step comprises the step of detecting an off-hook condition of a voice communications device associated with the modem.

16. A method according to claim 15, wherein said step of detecting the presence of an off-hook condition comprises the step of detecting at least one of a line current and a line voltage in a connection associated with the voice communications device.

17. A method according to claim 15, wherein said step of detecting an off-hook condition comprises the step of detecting the presence of a dial tone.

18. A method according to claim 11, wherein the detecting step further comprises the step of detecting the termination of an active voice communication in the first frequency range.

19. A method according to claim 18, wherein the step of detecting the termination of an active voice communication in the first frequency range comprises at least one of detecting an absence of a signal in the first frequency range and detecting an absence of a line voltage in a connection associated with a voice communications device associated with the modem.

20. A method according to claim 18, further comprising the steps of:

increasing an output power associated with data communication in the second frequency range when a the termination of a voice communication in the first frequency range is detected; and retraining utilizing the increased output power.

21. A system for controlling a digital subscriber loop (DSL) modem which provides simultaneous voice and data communications, wherein the voice communication is provided in a first frequency range and the data communication is provided in a second, non-overlapping, frequency range, the system comprising:

means for detecting a voice communication in the first frequency range; and means for increasing at least one of a coding rate and an interleaving level associated with the data communication in the second frequency range when a voice communication in the first frequency range is detected.

22. A system according to claim 21, further comprising means for increasing a start frequency associated with data communication in the second frequency range when a voice communication in the first frequency range is detected.

23. A system according to claim 21, further comprising means for decreasing a number of tones utilized in data communication in the second frequency range when a voice communication in the first frequency range is detected.

24. A system according to claim 21, wherein the means for detecting comprises means for detecting a ringing tone in the first frequency range.

25. A system according to claim 21, wherein the means for detecting comprises means for detecting an off-hook condition of a voice communications device associated with the modem.

26. A system according to claim 21, wherein said means for detecting the presence of an off-hook condition comprises means for detecting at least one of a line current and a line voltage in a connection associated with the voice communications device.

27. A system according to claim 21, wherein said means for detecting an off-hook condition comprises means for detecting the presence of a dial tone.

28. A system according to claim 21, wherein the means for detecting further comprises means for detecting the termination of an active voice communication in the first frequency range.

29. A system according to claim 28, wherein the means for detecting the termination of an active voice communication in the first frequency range comprises at least one of means for detecting an absence of a signal in the first frequency range and means for detecting an absence of a line voltage in a connection associated with a voice communications device associated with the modem.

30. A system according to claim 28, further comprising:

means for increasing an output power associated with data communication in the second frequency range when a the termination of a voice communication in the first frequency range is detected; and means for retraining utilizing the increased output power.

* * * * *